UNITED STATES PATENT OFFICE.

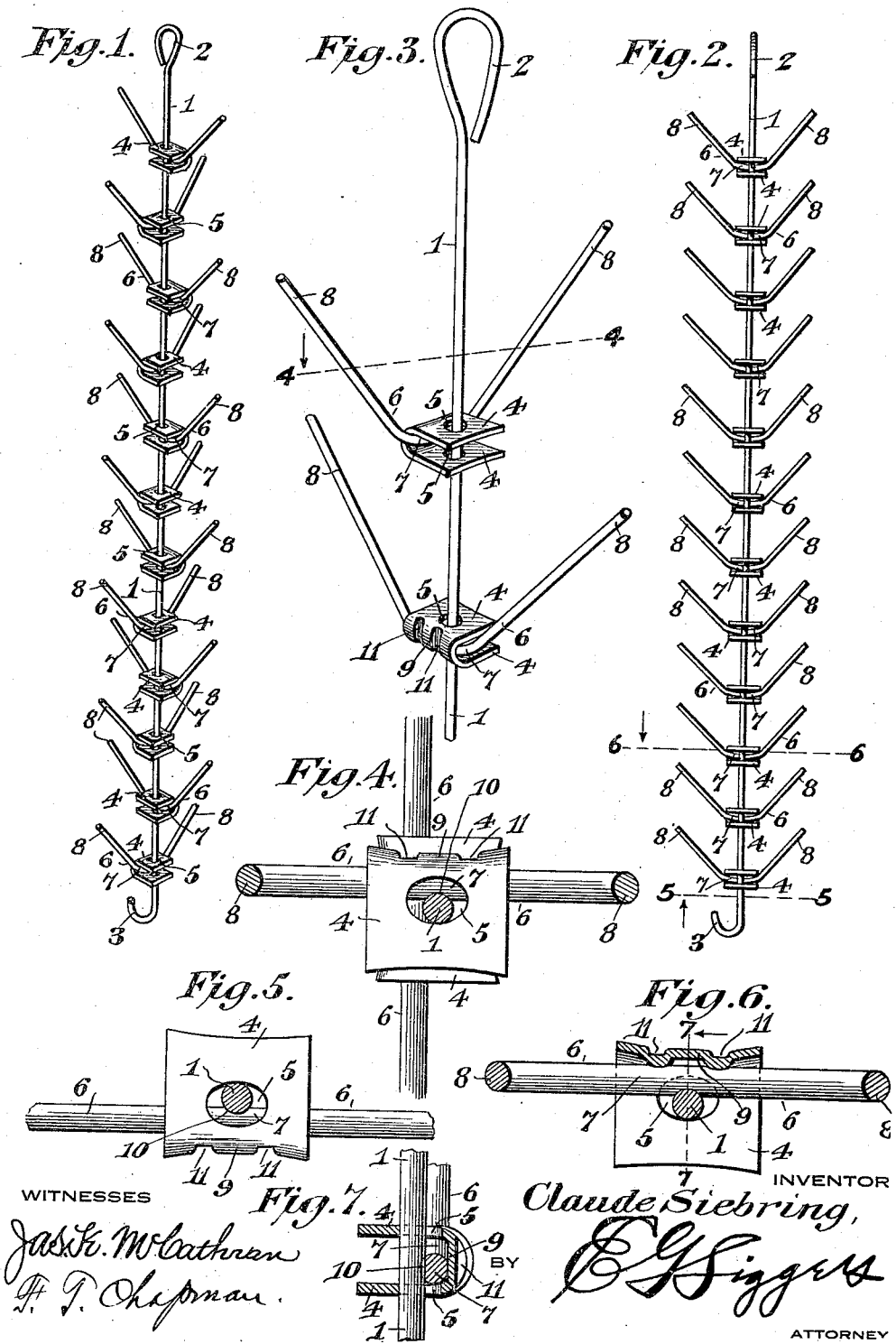

CLAUDE SIEBRING, OF GEORGE, IOWA.

SEED-CORN DRIER.

1,280,567.  Specification of Letters Patent.  Patented Oct. 1, 1918.

Application filed December 26, 1917. Serial No. 208,871.

*To all whom it may concern:*

Be it known that I, CLAUDE SIEBRING, a citizen of the United States, residing at George, in the county of Lyon and State of Iowa, have invented a new and useful Seed-Corn Drier, of which the following is a specification.

This invention has reference to seed corn driers, and its object is to provide a simple device whereby a group, especially a group containing a definite number of ears of corn, may be suspended, where it will be subjected to currents of air to thoroughly and evenly dry out the corn.

The invention comprises an elongated stem or rod upon which clip devices are strung in spaced relation, and these clip devices carry and confine against the rod or stem a corresponding number of V-shaped or bent rods having their ends in angular relation to the supporting stem or rod so as to provide pairs of impaling members for the corn, the arrangement being such that the impaling members are held to the supporting stem solely by the clips without the necessity of special preparation of the stem. The arrangement also provides for the ready turning of the impaling members about the stem as an axis while resisting movements of the impaling members lengthwise of the stem.

The invention will be best understood from a consideration of the following detailed description, taken in connection with the accompanying drawings forming part of this specification, with the further understanding that, while the drawings show a practical form of the invention, the latter is not confined to any strict conformity with the showing of the drawings but may be changed and modified, so long as such changes and modifications come within the scope of the appended claims.

In the drawings:—

Figure 1 is a perspective view of the drying device of the invention, with the impaling members disposed for receiving the ears of corn;

Fig. 2 is an elevation of the device of Fig. 1, with the impaling members arranged in one plane for transportation or storage;

Fig. 3 is a view of a portion of the structure of Fig. 1, as seen from a somewhat different angle, and drawn on a larger scale;

Fig. 4 is a section on the line 4—4 of Fig. 3, and drawn on a still larger scale;

Fig. 5 is a section on the line 5—5 of Fig. 2, but drawn on the scale of Fig. 4;

Fig. 6 is a section on the line 6—6 of Fig. 2, and drawn on the scale of Figs. 4 and 5;

Fig. 7 is a section on the line 7—7 of Fig. 6.

Referring to the drawings, there is shown a stem 1 which may be in the form of a straight metal rod or wire of suitable gage bent into a loop 2 at one end and into a loop or hook 3 at the other end. Applied to the stem 1 are clips 4 each comprising a plate bent upon itself to general U-shape, with the legs of the clip each having a perforation 5 therein, with the perforations traversed by the rod or stem 1. The perforations 5 are somewhat larger than the stem or wire 1, so that the latter may have an initially loose fit in the clips.

The length of the stem 1 and the number of clips 4 strung upon the stem will, of course, depend upon circumstances, but ordinarily, it is desirable to provide 12 clips, since the drier, as will be hereinafter seen, will then accommodate 24 ears of corn.

Extending through each clip in a direction transversely of the length of the rod or stem 1, is a wire or rod 6 bent intermediately of its length into a curve 7 from which project straight ends 8 in divergent relation one to the other, whereby the general shape of the rod 6 is that of a comparatively flat V. The curved portion 7 may be nearly flat or straight so as to traverse the clip 4 which has the leg portions somewhat more separated than the thickness of the rod, whereby the mid portion of the curve 7 may bear against the inner face of one leg, while the curved portion on opposite sides of the mid portion bears against the other leg of the clip.

The rod 6 is confined between the yoke or curved portion of the clip shown at 9, and the rod or stem 1, and at the side of the curved portion 7 at its mid point, there is produced a notch 10 into which the rod 1 enters, thereby preventing any side motion of the rod 6 but not interfering at all with rotative movements of the rod 6 about the stem 1 as an axis. To lock the clip 4 on the rod 6 individual thereto, the yoke portion 9 of the clip has indentations 11 formed therein on opposite sides of the center of the yoke portion 9, these indentations biting slightly into the rod 6 to anchor the rod and yoke together against the stem or rod 1. These indentations may be conveniently made by a suitable machine, which, however, is not shown in the drawings. The representation of these indentations in the drawings is somewhat exaggerated, since Figs. 4 to 7 are magnified views, and the showing of Fig. 3 is exaggerated, so far as the indentations are concerned, for the sake of clearness.

The effect of the indentations 11 is to force the clip 4 where traversed by the rod 1 tightly against the latter and to force the yoke 9 tightly against the rod 6, with the rod 6 in turn in firm engagement with the stem 1. However, the extent of surface engagement between the clip 4 and rod 1, and between the rods 1 and 6, while sufficient to insure considerable frictional resistance, is not sufficient to prevent the turning of the rod 6 with its impaling ends 8 about the stem 1 as an axis. The surface engagement resistant to movement of the impaling members lengthwise of the stem 1 is greater, and consequently, under ordinary conditions of use, the impaling members will hold their positions on the stem 1 against movement lengthwise thereon, but may be turned about the stem 1 as an axis.

When the device is to be shipped or stored, the ends 8 of the rod 6 are all brought into one plane lengthwise of the stem 1, so that the whole device is relatively flat. When, however, it is desired to use the device for carrying ears of corn, the impaling devices are turned alternately into planes at right angles to each other lengthwise of the stem 1, so that ears of corn impaled lengthwise on the ends 8 outstand from the stem 1 in diagonally outward directions, so that the neighboring ears are in different planes longitudinally of the stem 1. This gives ample room for the circulation of air, and as the whole device with the ears of corn thereon may be hung up at a suitable height, the drying of the ears is greatly facilitated, and it is possible to use space for drying purposes which would not otherwise be available.

What is claimed is:—

1. A seed corn drier comprising an elongated stem with substantially V-shaped cross members having impaling terminals, and yoke-shaped clips embracing the cross members and confining them at their mid points against the stem, with the cross members each disposed in a plane lengthwise of the stem.

2. A seed corn drier comprising an elongated stem with substantially V-shaped cross members having impaling terminals, and yoke-shaped clips embracing the cross members and confining them at their mid points against the stem, with the cross members each disposed in a plane lengthwise of the stem, each cross member having a notch on one side seating the stem where engaging it, and the clip individual to the cross member having spaced indentations engaging the cross member on opposite sides of its mid point.

3. A seed corn drier comprising a stem in the form of a round rod of like conformation throughout, clips on and traversed by the stem, and corn holding members extending through the clips transversely of the stem and having their ends in diagonal relation to the length of the stem and all directed toward one end of the stem, said clips and corn holding members being rotatable about the stem and bound by the clips against the stem to resist movement lengthwise of said stem.

4. A seed corn drier comprising an elongated stem, substantially V-shaped cross members having impaling terminals, yoke-shaped clips embracing the cross members and provided with registering openings for the passage of the stem, and means provided on the clips to prevent the movement of the cross members in the clips, as well as the movement of the clips along the stem, but allowing bodily movement of the clips and cross members around the stem.

5. A seed corn drier comprising an elongated stem with substantially V-shaped cross members having impaling terminals, and yoke-shaped clips embracing the cross members and confining them at their mid points against the stem, with the cross members each disposed in a plane lengthwise of the stem, and the clip individual to the cross member having spaced indentations engaging the cross member on opposite sides of its mid point.

In testimony that I claim the foregoing as my own I have hereto affixed my signature in the presence of two witnesses.

CLAUDE SIEBRING.

Witnesses:
 J. A. PARDEN,
 J. OLTMANN.

Copies of this patent may be obtained for five cents each, by addressing the "Commissioner of Patents, Washington, D. C."